United States Patent [19]

Taylor

[11] Patent Number: 4,968,968

[45] Date of Patent: Nov. 6, 1990

[54] TRANSMITTER PHASE AND AMPLITUDE CORRECTION FOR LINEAR FM SYSTEMS

[75] Inventor: Stephen D. Taylor, Agoura, Calif.

[73] Assignee: Hughes Aircraft Company, Los Angeles, Calif.

[21] Appl. No.: 434,968

[22] Filed: Nov. 9, 1989

[51] Int. Cl.[5] .............................................. H04B 1/02
[52] U.S. Cl. .................................... 342/174; 342/128
[58] Field of Search ............... 342/122, 128, 173, 174, 342/200; 331/4, 178

[56] References Cited

U.S. PATENT DOCUMENTS 4,160,958 7/1979 Mims et al. ........................... 331/178
4,359,779 11/1982 Levine .................................. 455/110
4,584,710 4/1986 Hansen .
4,692,766 9/1987 Rolfs .

OTHER PUBLICATIONS

"Digital Generation of Wideband Linear FM Waveforms", R. W. Hopwood, R. A. Tracy, Westinghouse Electric Corporation, pp. 111-113.
"A Direct Digitally Synthesized Exciter Achieving Near Theoretical Performance for an Operation SAR System", W. D. Gallaway et al., Environmental Research Institute of Michigan.

Primary Examiner—Thomas H. Tarcza
Assistant Examiner—Mark Hellner
Attorney, Agent, or Firm—Leonard A. Alkov; Wanda K. Denson-Low

[57] ABSTRACT

A system is disclosed for measuring and correcting for waveform modulation errors in a radar system employing FM signals and a digitally controlled waveform generator. The system relies on the assumption that the transmitter and other waveform phase and amplitude error contributions are slowly varying with respect to the radar mode data collection time and that instantaneous pulse-by-pulse correction is not necessary. During a calibration mode, a small portion of the transmitter output is input into the receiver and mixed with the waveform generator signal, with the waveform modulation being removed from the mixer signal, such that the mixer signal is at a constant IF but with phase and amplitude variations that result from the distortions. The radar digital processor measures these distortions, and during normal radar operation predistorts the waveform generator signal with phase distortions in antiphase with the measured distortions to compensate for the measured distortions. Amplitude distortions are compensated by control of a variable attenuator device. As a result, the system compensates for the exciter and transmitter distortions as well as distortions introduced by the receiver input circuitry.

22 Claims, 4 Drawing Sheets

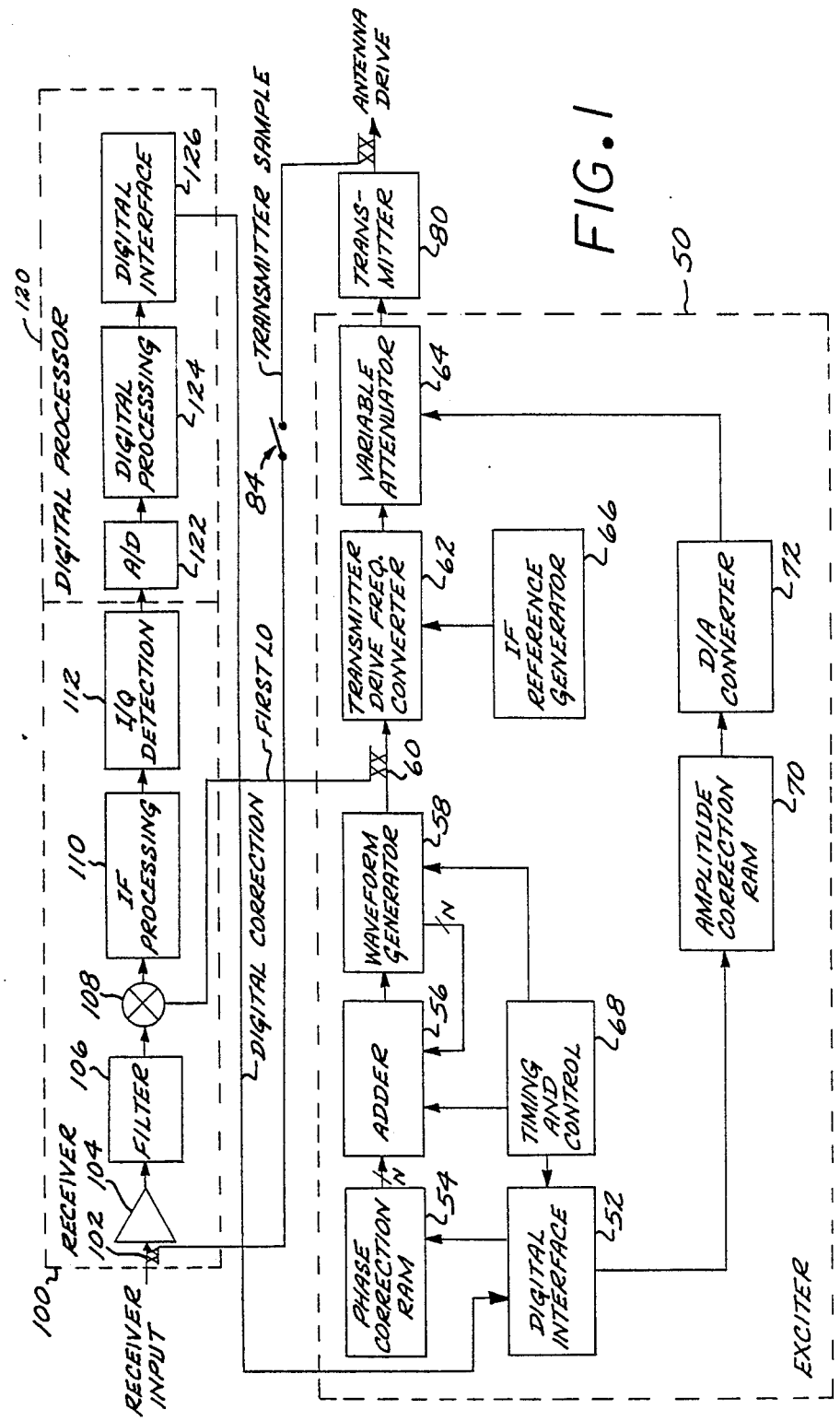

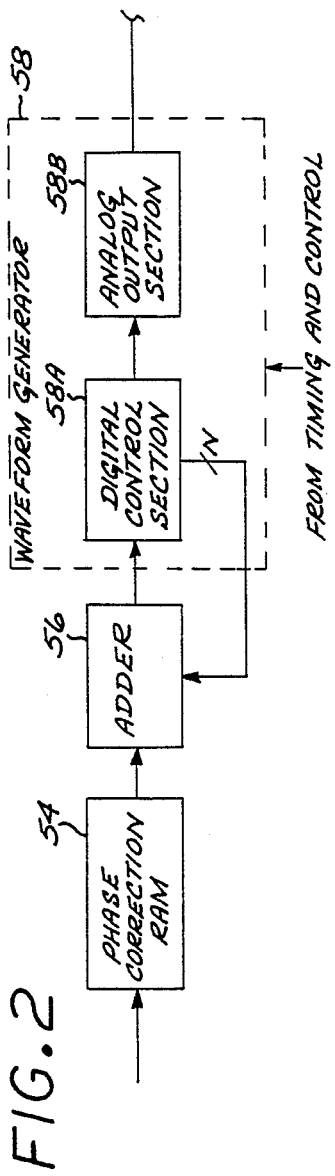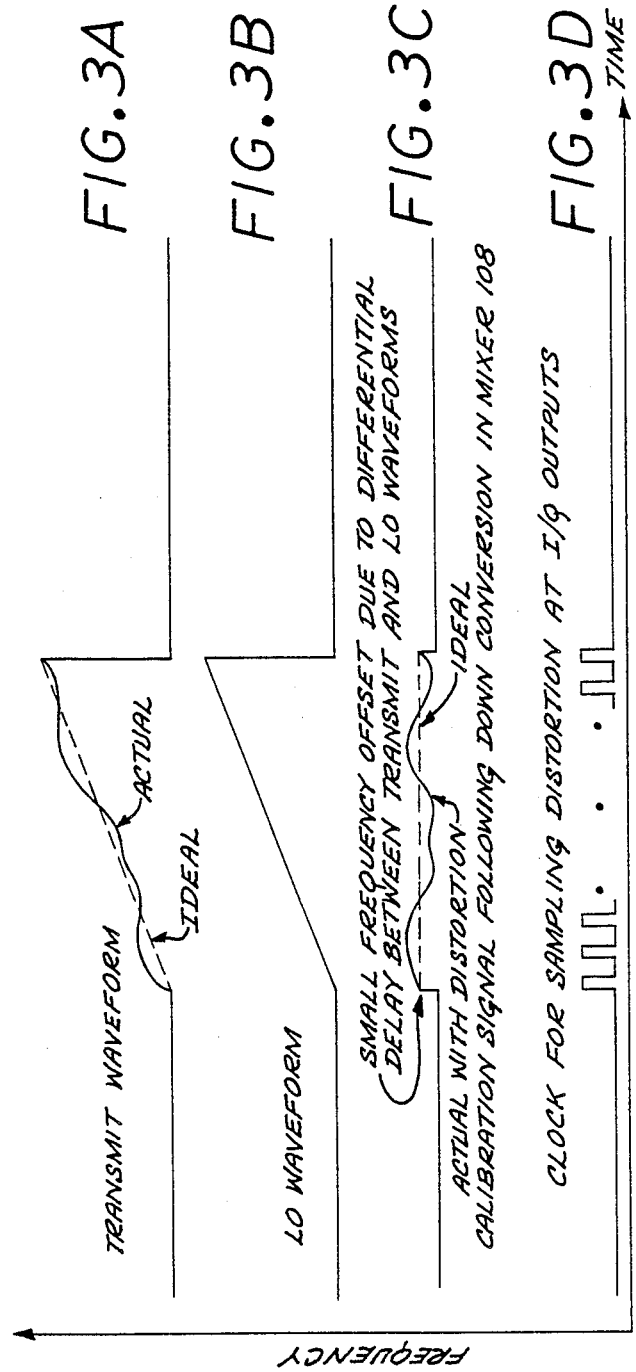

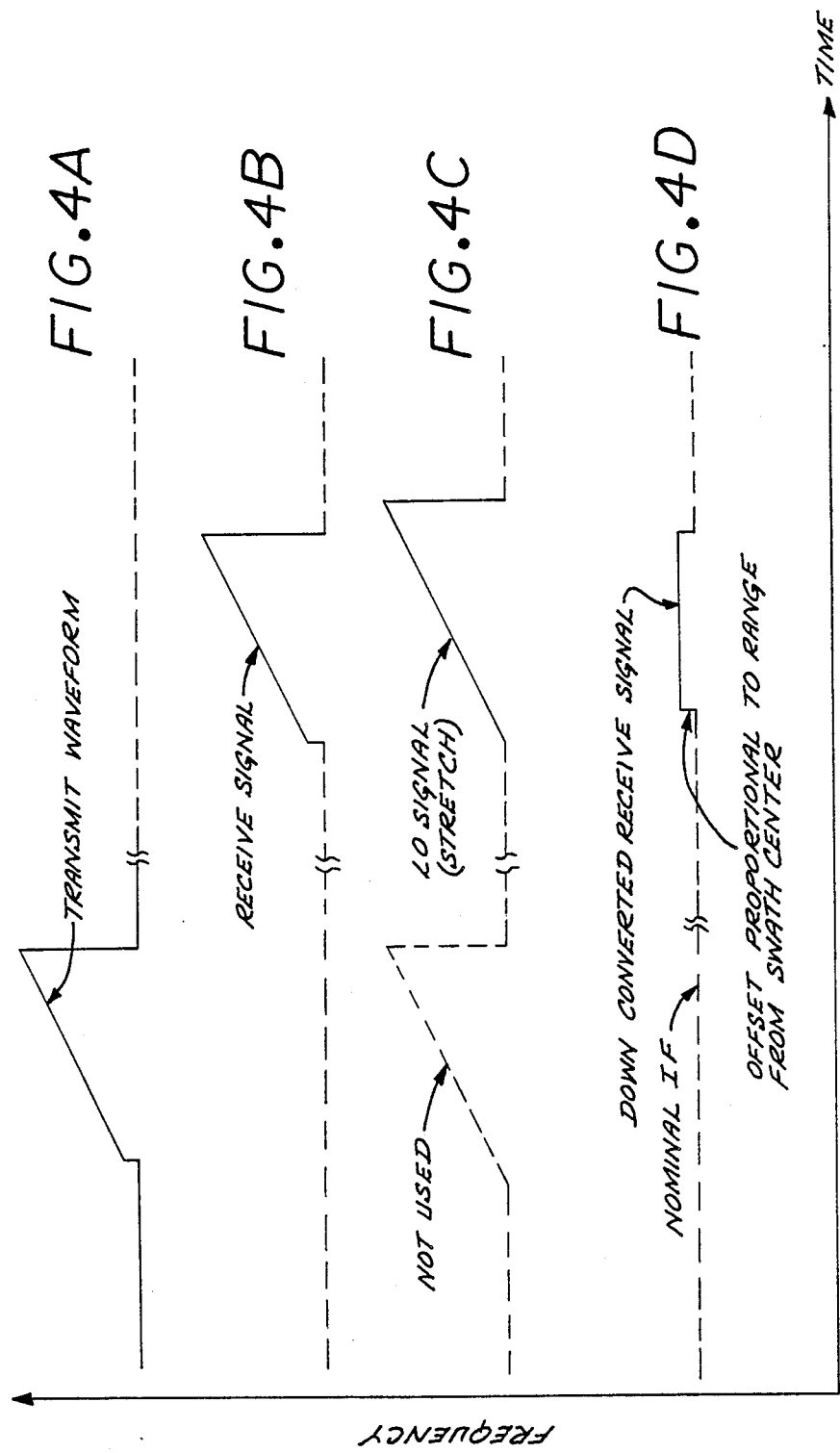

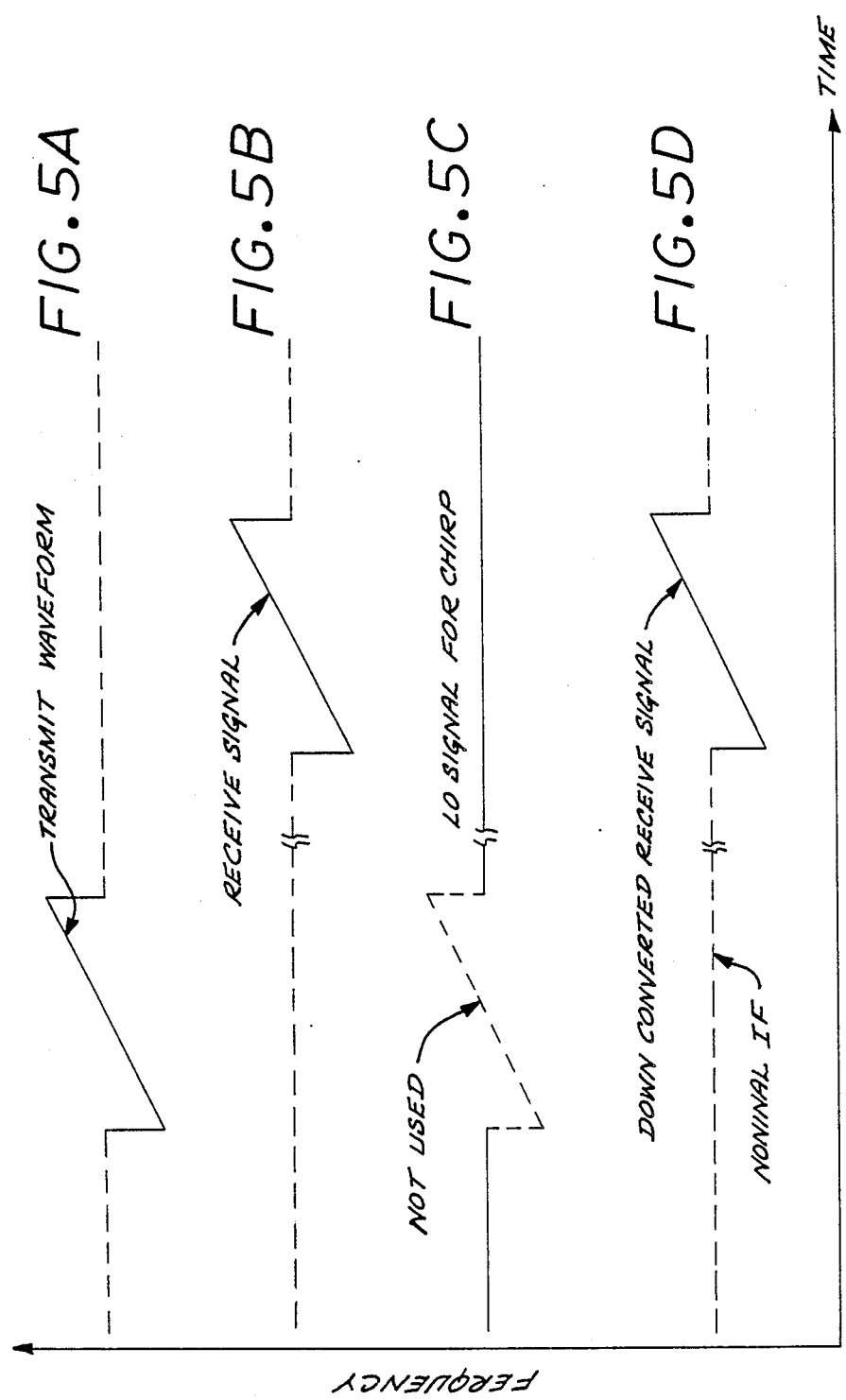

TRANSMITTER PHASE AND AMPLITUDE CORRECTION FOR LINEAR FM SYSTEMS

BACKGROUND OF THE INVENTION

The present invention relates to a system to detect and correct system-introduced distortions to chirp and stretch waveforms used in radar systems.

Chirp or stretch waveforms, which employ linear ramp frequency modulation formats, are frequently used to provide pulse compression for radar range resolution enhancement. Good performance from these waveforms is obtained only if phase and amplitude distortions introduced in the waveform signal path are controlled. Such distortions arise from the exciter output circuitry, the radar transmitter, and the receiver circuitry.

A known technique to generate linear, wideband chirp and stretch waveforms includes the exciter output circuitry and transmitter in the waveform generation and linearization process. With the technique, the basic ramp frequency modulation is applied to an open loop voltage controlled oscillator (VCO). Using a delay line frequency discriminator as the modulation error measuring device, a feedback loop is closed around the discriminator, VCO, exciter output circuitry, and transmitter. The instantaneous slope error of the transmitter output waveform is measured by the discriminator, converted into a voltage, and summed with the open VCO modulation to effect the linearization. That technique requires a complex feedback control loop that typically is divided between separate hardware units and is severely limited in the range of waveform slopes that it can accommodate with a given delay used in the discriminator.

A second previous technique, described in U.S. Pat. No. 4,359,779, accomplishes the correction by enclosing the transmitter and exciter output circuitry in phase sensitive and amplitude sensitive feedback control loops. A phase sensitive detector generates a phase error signal by comparison of a sample of the transmitter output waveform with a precisely delayed sample of the waveform generator output. That error signal is applied to a phase modulator for correction. Precise delay equalization between the waveform generator and transmitter sample signals is required to minimize the phase range required for the phase modulator. The amplitude control loop compares the detected amplitude of the transmit signal with a reference voltage and applies the resulting error voltage to the transmitter driver for correction. The feedback action maintains a constant (or other desired profile) pulse amplitude. This approach require two feedback control loops, precise delay equalization, a high performance phase modulator, and considerable other electronics to insure that the errors at the beginning of each pulse are zeroed to prevent large waveform errors due to starting transients and the resulting loop setting.

While those techniques are effective, substantial additional hardware is required and the feedback loop are generally complex. The feedback control loop(s) are also typically closed around circuit functions that reside in different units, making test and fault isolation difficult.

It is therefore an object of this invention to provide a system for transmitter phase and amplitude correction for linear FM systems which requires little additional hardware, and does not require complex or high precision circuitry.

A further object is to provide a correction system which corrects for FM system receiver distortions ahead of the first downconversion mixer.

Yet another object is to provide a phase and amplitude distortion correction system which provides correction data in a digital format, and thereby permits processing to easily shift the data set to obtain a zero first correction to avoid the introduction of waveform starting transients or to digitally filter the data to effect smoothing of the applied correction.

SUMMARY OF THE INVENTION

The invention, in a general sense, is a system for distortion compensation in a radar system employing a frequency modulated (FM) waveform. The radar system comprises a radar transmitter for generating RF transmit signals, and a radar exciter comprising a digitally controlled waveform generator responsive to digital control signals for generating a desired waveform to be used to modulate the system RF transmit signal. A radar receiver processes RF input signals, and comprises a first downconverting mixer for mixing the received return signal with the signal generated by the exciter waveform generator to provide a receiver downconverted signal, means for processing the downconverted signal and detector means for providing detected analog signals. A digital processor comprises analog-to-digital converting means for converting the detected analog signal to digital form, and digital computer means responsive to the digitalized detected signals for providing digital control signals to control the exciter waveform generator.

Means are provided, in accordance with the invention, for selectively connecting a small portion of the transmitter output to the receiver input during a system calibration mode. During this mode the receiver downconverted signal is a nominally constant IF signal with phase and amplitude variation resulting from the distortions. The system further includes a digital memory for storing digital distortion correction data. The digital processor further comprises means operable in the calibration mode for sampling the receiver detected signals to measure the phase and amplitude distortions, and generating distortion correction signals in digital form, the correction signals being stored in the digital memory means. The system further comprises means operable during the radar system operating mode and responsive to the distortion correction signals for providing digital control signals to said waveform generator so as to generate waveforms which are predistorted by distortion corrections to compensate for the distortions measured during the calibration mode.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1 is a schematic block diagram of a transmitter phase and amplitude correction system in accordance with the invention.

FIG. 2 is a block diagram of the digitally controlled waveform generator in the system of FIG. 1.

FIGS. 3A-3D are waveforms illustrative of the distortion measurement in accordance with the invention.

FIGS. 4A–4D illustrate an exemplary transmitter drive signal and an exemplary waveform generator signal for stretch operation.

FIGS. 5A–5D illustrate an exemplary transmit signal and an exemplary waveform generator signal for chirp operation.

DETAILED DESCRIPTION OF THE PREFERRED EMBODIMENT

The invention relates to a radar system calibration and correction procedure to measure and correct transmitter and other sources of chirp or stretch waveform modulation errors. The invention is applicable to digitally based waveform generators or other types that allow accurate digitally controlled predistortion of the transmitter drive waveform. The calibration is accomplished prior to the use of a selected waveform and repeated at infrequent times during its use to maintain accurate error correction. The validity of the technique is based on the assumption that the transmitter and other waveform phase and amplitude error contributions are slowly varying with respect to the radar mode data collection time, and that instantaneous, pulse by pulse correction, as provided by the previous techniques, is not necessary. Inherently, that is a reasonable assumption, because variation in the error characteristics will result from slowly varying conditions, such as temperature and component aging.

Referring now to FIG. 1, there is shown a schematic block diagram of a radar system embodying a phase and amplitude correction system in accordance with the invention. The system comprises, in a general sense, a radar exciter 50, a radar transmitter 80, a radar receiver 100, and a digital processor 120. These types of elements are, of course, standard components in many radar systems and are, except as described hereinbelow, well known to those skilled in the radar arts.

The exciter 50 comprises the digital interface 52 for receiving digital mode and control signals from the digital processor 120, the waveform generator 58 for generating the desired waveform, the coupler 60 for coupling off a portion of the waveform signal energy to send to the receiver 100 to act as a first local oscillator (LO) signal, the transmitter drive frequency converter 62 and IF reference generator 66 for upconverting the signals from the waveform generator 58 by an intermediate frequency (IF). The timing and control device 68 provides timing and control signals to the waveform generator 58 in accordance with digital control signals received via the digital interface 52 from the digital processor 120.

The elements 52, 58, 60 and 62 are conventional components of many radar exciters which employ linear FM signals. The waveform generator 58 is preferably a digitally controlled waveform generator, responsive to digital control signals for generating the desired waveform. Such waveform generators are well known. For a reference describing such a generator, see "Sampling Linearizer Utilizing a Phase Shifter," U.S. Pat. No. 4,160,958.

FIG. 2 further illustrates the waveform generator 58 as comprising a digital control section 58A which provides the nominal digital control signal, an n bit word, which is combined in adder 56 with the phase correction signal, another n bit word, to provide a digital control signal containing the phase predistortion defined by the phase correction RAM signal. The predistortion-bearing digital signal is fed to the analog output section 58B which generates the analog waveform signal in response thereto.

The exciter 50 further comprises a random access memory (RAM) 54 for storing phase correction data provided from the digital processor 120 after a calibration process in accordance with the invention, and a digital adder 56 which functions to add the phase correction signal from RAM 54 to the digital control signal defining the waveform (without predistortion). The exciter 50 further comprises an amplitude correction RAM 70 for storing amplitude correction data received from the digital processor 120, a digital-to-analog converter (DAC) 72 for converting amplitude correction digital signals into analog form, and a variable attenuator 64 for attenuating the output from the transmitter drive frequency converter 62 to provide amplitude compensation in accordance with the invention. As will be described further below, the phase correction RAM 54 and variable attenuator 64 provide a means for predistorting the transmit waveform signal to compensate for modulation errors, and certain receiver distortions.

The radar transmitter 80 is well known in the radar arts, and is not described in further detail herein.

The radar receiver 100 comprises an input coupler 102 for providing a means for inputting a signal through RF switch 84 from the transmitter output. Many radar receivers employ such a coupler as a means for inputting test signals. The receiver 100 includes filter 106 and mixer 108 for mixing the filtered signal with the first LO signal from the exciter 50. The downconverted received signal is then processed by IF processor 110, which performs such functions as automatic gain control, filtering, amplification, and depending on the implementation, a further frequency downconversion. The receiver 100 further includes an inphase and quadrature detector 112 for coherently detecting the information modulated on the received waveform. Each of the foregoing elements of the receiver 100 is conventional and can be found in existing radar receivers.

The digital processor 120 includes an analog-to-digital converter 122, the digital processing device 124, such as a digital computer, and the digital interface element 126 which provides digital communication with the exciter 50.

Referring again to FIG. 1, the error calibration and correction in accordance with the invention is accomplished as follows. The waveform generator 58 is enabled to produce a repetitive series of the desired waveform at the receiver first local oscillator (LO) frequency. That signal functions as the receiver first LO and as a reference to the transmitter drive frequency converter 62. The converter 62 offsets the reference signal frequency by the receiver first IF to produce the transmitter drive signal, which also carries the waveform modulation. The converter output signal is fed through an electronically controlled attenuator 64 that, in accordance with the invention, provides waveform amplitude error correction to compensate for transmitter amplitude distortions. A low power sample of the transmitter output waveform is routed through the RF switch 84 to the test coupler 102 at the receiver 100 input. The switch 84 functions to remove the calibration signal during normal radar system operation.

At the receiver first mixer 108, both the test signal from the transmitter 80 and the first LO signal from the waveform generator 58 carry the same basic waveform modulation, but the transmitter sample also carries the distortions introduced by the transmitter drive frequency converter 62, the transmitter, and receiver input circuitry 104 and 106. The basic waveform modulation will, therefore, be removed by the mixer 108 and the output will be at a constant IF but with phase and amplitude variations that result from the distortions. It should be noted that the differential delay between the test signal and LO waveforms will produce a small offset frequency from the nominal receiver IF. The calibration process, however, will remove that offset by shifting the transmitter drive frequency by a corresponding amount without need for the precision delay equalization of prior techniques. The digital processor 120 detects the linear phase progression associated with the frequency offset as well as the phase deviations due to distortions. When applied to the waveform generator 58 for correction, a frequency offset, as well as the previously discussed predistortion, is generated at the waveform generator output. The shifting of the waveform generator output frequency, and therefore also the transmit frequency, has an added benefit of providing a "center of the radar mapping range swath" calibration for stretch waveforms. With the predistortion and offset frequency corrections applied to the transmit drive signal during normal radar operation, zero deviation from the nominal IF would correspond very closely to signal returns from the swath center. That operation is possible for stretch waveforms because the transmit drive signal waveform would carry the predistortion and offset frequency, while the receiver first LO waveform, which is generated at a preset delay from the transmit waveform to correspond to the target signal returns from the range swath of interest, would not.

The mixer 108 output signal is processed through the receiver IF circuitry 110, in phase and quadrature (I/Q) detected at IQ detection circuitry 112, and converted to digital data.

The radar digital processor 120 controls the sampling of the I/Q signals in a manner that is compatible with the waveform generator to effect the desired predistortion of the transmitter drive waveform. For a digital waveform generator that generates the waveform in synchronism with a clock signal, for example, I/Q samples could be timed to correspond to that clocking. Depending on processor timing and data storage constraints, the sampling may occur entirely with a single waveform or over a series of waveforms, with the sample time progressively advanced across the waveform pulse width. The former operation is illustrated in FIGS. 3A-3D, where FIG. 3A illustrates an exemplary signal sampled from the transmitter 80 output, and therefore carrying the modulation distortion; and FIG. 3B illustrates the waveform generator 58 output signal, which is undistorted. These two signals are mixed together in mixer 108, and the resulting distortion signal is shown in FIG. 3C. This signal is progressively sampled by moving the A/D sample pulse progressively over the pulse period to sample the distortion at successive sample points over the waveform. The distortion may then be characterized by a number of data samples, which number may typically be quite large (in the thousands) to provide a detailed, accurate measure of the distortion at successive time points within the pulse interval. These data samples are then processed by the digital processing section 124 to determine the necessary phase and amplitude distortion for each sample point. This data is then stored in the respective RAMS 54 and 70, which are addressed during normal radar system operation by signals which select the particular memory locations whose stored contents correspond to the particular time instant within the pulse period.

The processor converts the sampled I/Q data into digital amplitude and phase data, performs any desired smoothing or offset processing, and sends it to the radar exciter. The correction data is stored in random access memory (RAM) in the exciter, and during transmit waveform generation, is read out and applied as a compensating correction to the waveform.

The phase correction data is added to or subtracted from, as appropriate, the digital phase control data within the waveform generator. Thus, the phase correction data for each point is in antiphase with the measured phase distortion for that point.

For stretch modulation, the receiver LO is also modulated, but is delayed from the transmit modulation by the target range delay and is not predistorted with the correction data. The predistortion of the transmitter drive signal provides the corrections needed to compensate for the transmitter drive output circuitry, transmitter, and receiver input circuitry. When the predistorted waveform is processed through these functions during normal radar operation, the waveform at the mixer 108 input that results from a point target reflector will not carry the distortions of these radar elements. To process that waveform, which has arrived at the mixer a substantial time after its original generation (a delay longer than the waveform duration), a separate LO waveform must be generated and timed to coincide with target returns from the range swath of interest. Because the LO waveform does not pass through elements of the radar that will introduce significant distortion, calibration and correction of that waveform is not needed. This operation is shown in FIGS. 4A-4D. FIG. 4A shows the transmit waveform, FIG. 4B shows the receive signal waveform from a point reflector, FIG. 4C shows the first LO waveform timed to coincide with the target return signal, and FIG. 4D shows the down converted mixer 108 output signal at a constant offset frequency from the nominal IF corresponding to the range displacement from swath center. It should be noted that a predistorted LO signal is generated as a necessary part of transmit waveform generation, but the receiver is gated off during that time and that LO waveform is not used by the radar for receive signal processing.

For conventional chirp operation the LO is not modulated during the target signal receive time. This is illustrated in FIGS. 5A-5D. FIG. 5A illustrates the transmitter drive waveform (the output of the exciter 50) during normal radar system operation, FIG. 5B illustrates the target return signal from a point reflector, FIG. 5C illustrates the first LO (the output of the waveform generator 58), and FIG. 5D illustrates the signal following down conversion by mixer 108. In the case of chirp modulation, the LO is not modulated during the receive time and, therefore, no waveform deramping takes place. The LO waveform shown in FIG. 5B is produced only as a part of generating the desired transmitter drive waveform. During the target signal reception time, the LO is a constant frequency signal as appropriate for down converting target signals to the desired IF. Similar to the stretch modulation case described above, the transmitter drive signal is predistorted to compensate for the transmitter drive output circuitry, the transmitter, and the receiver input circuitry.

If amplitude correction is employed for the transmit pulse, that data is read from an exciter RAM simultaneously with the phase data and applied to the attenuator or other power control device in the transmitter drive signal path as shown in FIG. 1. Details of that implementation include digital to analog conversion and linear interpolation or other smoothing of the correction for use with an analog power control element or direct digital control with a digital fine step attenuator. For some applications, amplitude correction may be unnecessary.

An exciter implementation for chirp only operation may locate the waveform generator at a point that will not produce the modulation on the receiver LO signal concurrent with the transmit modulation. If pulse compression is accomplished by digital processing techniques, distortion of that waveform may also be corrected by the described technique. In this case the transmitter sample waveform will be processed unaltered through the receiver, I/Q detection, and A/D conversion. No deramping of the waveform at the receiver first mixer will occur. The digital processor, however, can subtract the desired waveform phase progression from the measured phase data to obtain the phase distortion.

The calibration and correction process that has been described is compatible with most digital waveform generation techniques, including types that use N-bit phase shifters, types that digitally control the signal zero crossings, and types that use direct digital signal synthesis techniques. Although the description has been based on the chirp and stretch waveforms, it should also be noted that the technique is applicable to other modulation formats as well.

The principal advantages of the new technique are:

1. Minimal additional hardware is required. Additional hardware consists only of that needed to receive the digital correction data from the radar processor and add it as a predistortion to the transmitter driver waveform.

2. The new technique corrects for receiver distortions introduced ahead of the first down-conversion mixer, which are not corrected with previous techniques.

3. Since correction data is in a digital format, processing can be easily implemented to shift the data set to obtain a zero first correction to avoid the introduction of waveform starting transients or to digitally filter the data to effect smoothing of the applied corrections.

4. The new technique does not require complex or high precision circuitry. Current transmitter correction loop techniques compare a reference transmitter drive signal with a sample of the transmitter output and must provide precise delay to the reference signal to match the transmitter delay. Practical delay tolerance, however, still requires a wide range microwave phase shifter to effect the phase correction for high slope waveforms.

It is understood that the above-described embodiments are merely illustrative of the possible specific embodiments which may represent principles of the present invention. Other arrangements may readily be devised in accordance with these principles by those skilled in the art without departing from the scope of the invention. For example, the adder function of element 56 and the function of memories 54 and 70 could be carried out by the digital processor 120, so that the digital processor supplies directly to the exciter the digital control signals for the waveform generator 58 which take into account the necessary predistortions needed for compensation.

What is claimed is:

1. A system for distortion compensation in a radar system employing a frequency modulated (FM) waveform, comprising:
   a radar transmitter for generating RF transmit signals;
   a radar exciter comprising a digitally controlled waveform generator responsive to digital control signals for generating a desired waveform to be used to modulate the system RF transmit signal;
   a radar receiver for processing RF input signals, comprising a first downconverting mixer for mixing the received return signal with the signal generated by the exciter waveform generator to provide a receiver downconverted signal, means for processing the downconverted signal and detector means for providing detected analog signals;
   a digital processor comprising analog-to-digital converting means for converting the detected analog signal to digital form, and digital computer means responsive to the digitalized detected signals and providing digital control signals to control the exciter waveform generator;
   a digital memory for storing digital distortion correction signals;
   means for selectively connecting a small portion of the transmitter output to the receiver input during a system calibration mode;
   wherein the digital processor further comprises means operable in the calibration mode for sampling the receiver downconverted signal and to generate distortion correction signals in digital form, said correction signals stored in said digital memory means; and
   wherein the system further comprises means operable during the radar system operating mode and responsive to said distortion correction signals for providing digital control signals to said waveform generator so as to generate waveforms which are predistorted by distortion corrections.

2. The system of claim 1 wherein said waveform employs a linear ramp frequency modulation format.

3. The system of claim 2 wherein said waveform is a chirp waveform.

4. The system of claim 2 wherein said waveform is a stretch waveform.

5. The system of claim 2 wherein said waveform is a repetitive one, and wherein the digital processor is operable during said calibration mode to take a single sample of said distortion during each pulse, and wherein the sample point for each successive pulse is moved progressively over the sample period.

6. The system of claim 2 wherein said digital processor is operable during said calibration mode to take all samples of said distortion during a single pulse.

7. The system of claim, 1 wherein said digital distortion correction signals comprise phase distortion correction signals which are in antiphase with the corresponding phase distortions measured during said calibration mode, and wherein said digital memory comprises means for storing said phase distortion correction signals, and said system further comprises a digital adder means operable selectively during the radar operation mode for adding said phase distortion correction signals to digital waveform generator control signals defining the uncompensated waveform to form compensated digital waveform generator control signals for causing said waveform generator to generate predistorted waveforms, wherein the predistortions compensate for said distortions measured during said calibration mode.

8. The system of claim 7 wherein said exciter comprises said digital memory for storing phase distortion correction signals and said digital adder.

9. The system of claim 1 wherein said distortion correction signals comprise amplitude distortion correction signals for compensating for amplitude distortions measured during said calibration mode.

10. The system of claim 9 wherein said system further comprises digitally controlled variable attenuator means for varying the amplitude of the exciter output drive signal in response to said amplitude distortion correction signals to compensate for said amplitude distortions measured during said calibration mode.

11. The system of claim 10 wherein said digital memory means comprises a random access memory disposed in said exciter for storing said amplitude distortion correction signals.

12. The system of claim 1 wherein said digital memory means comprises a random access memory (RAM), and said digital processor further comprise means operable during the radar system operating mode for generating memory address signals in synchronism with digital timing control signals for said waveform generator so as to read digital distortion correction signals from the RAM in time correspondence with the digital signals defining the nominal waveform to be generated.

13. In a radar system having a radar exciter for providing drive signals employing linear frequency modulated (FM) waveforms, said exciter comprising a digitally controlled waveform for generating linear FM waveforms, a radar transmitter for transmitting RF signals in response to drive signals provided by said exciter, a receiver responsive to received RF signals and comprising means for downconverting said received RF signals to an intermediate frequency, said downconverting means comprising a mixer for mixing the received RF signals with said linear frequency modulated waveforms generated by said waveform generator, and means for processing said IF signals to provide detected receiver signals, and a digital processor responsive to said detected receiver signals, a distortion compensation system, comprising:
  means operable during a system calibration mode for selectively connecting a small portion of the transmitter output to the receiver input circuitry, wherein the downconverted signal is at a constant IF but with amplitude and phase variations resulting from distortions;
  means operable during said calibration mode for sampling said detected receiver signals for measuring said amplitude and phase variations and generating therefrom distortion correction signals in digital form, said correction signals stored in said digital memory means; and
  means operable during the radar system operating mode and responsive to said distortion correction signals for providing digital control signals to said waveform generator to cause said generator to generate waveforms which are predistorted by distortion corrections.

14. The system of claim 13 wherein said waveform is a chirp waveform.

15. The system of claim 13 wherein said waveform is a stretch waveform.

16. The system of claim 13 wherein said waveform is a repetitive one, and wherein the digital processor is operable during said calibration mode to take a single sample of said distortion during each pulse, and wherein the sample point for each successive pulse is moved progressively over the sample period.

17. The system of claim 13 wherein said digital distortion correction signals comprise phase distortion correction signals which are in antiphase with the corresponding phase distortions measured during said calibration mode, and wherein said digital memory comprises means for storing said phase distortion correction signals, and said system further comprises a digital adder means operable selectively during the radar operation mode for adding said phase distortion correction signals to digital waveform generator control signals defining the uncompensated waveform to form compensated digital waveform generator control signals for causing said waveform generator to generate predistorted waveforms, wherein the predistortions compensate for said distortions measured during said calibration mode.

18. The system of claim 17 wherein said exciter comprises said digital memory for storing phase distortion correction signals and said digital adder.

19. The system of claim 13 wherein said distortion correction signals comprise amplitude distortion correction signals for compensating for amplitude distortions measured during said calibration mode.

20. The system of claim 19 wherein said system further comprises digitally controlled variable attenuator means for varying the amplitude of the exciter output drive signal in response to said amplitude distortion correction signals to compensate for said amplitude distortions measured during said calibration mode.

21. The system of claim 20 wherein said digital memory means comprises a random access memory disposed in said exciter for storing said amplitude distortion correction signals.

22. The system of claim 13 wherein said digital memory means comprises a random access memory (RAM), and said digital processor further comprise means operable during the radar system operating mode for generating memory address signals in synchronism with digital timing control signals for said waveform generator so as to read digital distortion correction signals from the RAM in time correspondence with the digital signals defining the nominal waveform to be generated.

* * * * *

UNITED STATES PATENT AND TRADEMARK OFFICE
CERTIFICATE OF CORRECTION

PATENT NO. : 4,968,968
DATED : November 6, 1990
INVENTOR(S) : Stephen D. Taylor It is certified that error appears in the above-identified patent and that said Letters Patent is hereby corrected as shown below:

After the title and before the heading "BACKGROUND OF THE INVENTION," insert the paragraph: --This invention was made with Government support under Contract 86-C-0023 awarded by the Government. The Government has certain rights in this invention.--

Signed and Sealed this

Third Day of January, 1995

*Attest:*

BRUCE LEHMAN

*Attesting Officer*  *Commissioner of Patents and Trademarks*